Nov. 6, 1951 — A. P. KRUEGER — 2,573,912
TAPE-DISPENSING MACHINE
Filed April 16, 1947 — 2 SHEETS—SHEET 1

Inventor
Alfred P. Krueger
By Rockwell & Bartholow
Attorneys

Nov. 6, 1951   A. P. KRUEGER   2,573,912
TAPE-DISPENSING MACHINE
Filed April 16, 1947   2 SHEETS—SHEET 2

Inventor
Alfred P. Krueger
By Rockwell & Bartholow
Attorney

Patented Nov. 6, 1951

2,573,912

UNITED STATES PATENT OFFICE 2,573,912

TAPE-DISPENSING MACHINE

Alfred P. Krueger, Stratford, Conn., assignor to Derby Sealers, Incorporated, Derby, Conn., a corporation of Connecticut Application April 16, 1947, Serial No. 741,899

18 Claims. (Cl. 164—84.5)

This invention relates to tape-dispensing machines, and more particularly to a machine adapted for dispensing pressure-sensitive tape, or tape which is clingable or tacky upon one surface.

The dispensing of such tape has presented certain problems in that one surface of the tape is tacky and will tend to cling to any object with which it comes in contact, and, as the tape is usually wound upon a roll with the tacky surface of one layer in engagement with the non-tacky surface of the under layer, it requires an appreciable effort to draw the tape from the roll. Due to the fact that the tape tends to cling to any object with which it comes in contact, and to the fact that the tape sometimes acquires a static electrical charge and is drawn toward the feeding member, it is usually necessary, if the tape is drawn from the roll by some mechanical feeding means, to provide a stripper of some kind to strip the tape from the feeding means. Where the tape is grasped by the fingers and drawn from the machine, this stripping means should be so arranged as to provide a free projecting end portion of tape which can readily be grasped by the operator.

It is contemplated by the present invention to provide a tape-dispensing machine in which the tape is drawn from the roll or from the machine by the operator who grasps the free end of the tape and exerts a pull thereon. In addition, however, there is provided a feeding member or drum to which the tape clings and which is adapted when rotated to draw the tape from the roll, the rotation of the feeding member or drum being effected by the pull of the operator on the free end of the tape. As will be hereinafter explained, the mechanism is so arranged as to reduce the effort required to draw the tape from the supply roll.

There is also provided in the mechanism disclosed a severing member against which the tape may be torn off, this severing member being mounted for reciprocating or oscillating movement so that it may be moved rearwardly with respect to the tape on the feeding member or drum, so as to expose a free end of the tape and render it accessible to be grasped by the operator. The severing member is held in its normal or forward position by means of a spring (42, as illustrated) which will be of sufficient strength to enable the tape to be torn off without moving the severing member rearwardly.

It is also contemplated in the present invention to provide a stripper member which will cooperate with the feed member or drum so that the free end of the tape will not be permitted to cling to the drum. This stripper member may be fixed in position with respect to the machine, as shown in one form of the invention, or may be movable, and may be arranged to be operated by movement of the severing member, so that when the severing member is moved rearwardly to expose a free end of the tape, the stripping member will be moved in a direction to strip the tape from the feed drum if it tends to cling thereto.

One object of the present invention is to provide a new and improved device for dispensing tape.

A further object of the invention is to provide a new and improved device for dispensing tape, having a feed drum mounted upon a moving or oscillating member, arranged so that, when this member is drawn forwardly, the feed drum will be rotated.

A still further object of the invention is to provide a tape-dispensing machine having a feed drum mounted on a movable or oscillatable arm, and a severing member or tear-off blade also mounted on this arm and movable with respect thereto, so that the severing member may be moved with respect to the feed drum to expose the free end of the tape.

Still another object of the invention is to provide a new and improved tape-dispensing machine as described above, in which a stripper member is provided to cooperate with the feed drum and strip the tape therefrom if it tends to cling to the drum, the stripper member being in turn operated by movement of the severing member.

To these and other ends the invention consists in the novel features and combinations of parts to be hereinafter described and claimed.

Figure 1:
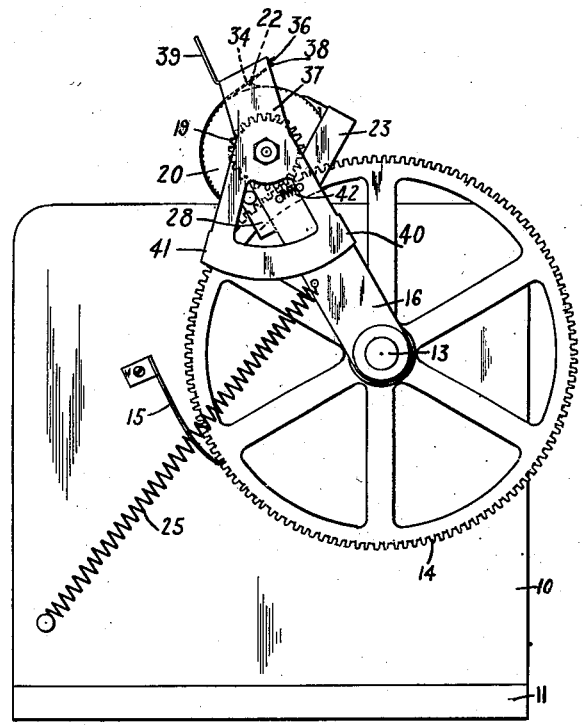
Fig. 1 is a side elevational view of a tape-dispensing machine embodying my invention.

To illustrate a preferred embodiment of my invention, I have shown in the accompanying drawings a tape-dispensing machine comprising a frame in the form of a plate 10, the plate being supported in upright position by a laterally extending flange 11 upon one side and brackets or legs 12 secured to the other side. Rotatably mounted in the frame member is a shaft 13, upon which shaft is loosely mounted a large gear 14, which, as will be explained, serves as a rack member rather than a gear. A pawl 15, secured to the plate 10 and engaging the teeth of the gear, restrains the latter from movement in one direction, that is, restrains it from movement in a clockwise direction, as shown in Fig. 1, but permits it to move in an anti-clockwise direction.

A pair of arms 16 and 17 are secured to the shaft 13 adjacent the ends thereof, these arms extending upwardly from the shaft in substantially parallel relation and rotatably carrying adjacent their upper ends a shaft 18. Upon the shaft 18 is secured a pinion 19, the teeth of which mesh with those of the gear 14, and also secured upon the shaft is the feed drum 20 having a knurled peripheral surface to which the tape is adapted to cling to a certain degree. The arms 16 and 17, therefore, serve as a support or carrier for the feed drum 20.

The feed drum 20 is provided with an annular groove or recess 21 in which is disposed a stripper finger 22 secured by an arm 23, by which the finger is carried, to the arm 16. The finger 22 projects slightly above the surface of the drum 20, so that the free end of the tape will not be permitted to engage the surface of the drum at that point.

From the foregoing it will be apparent that, when the carrier of the feed drum is rocked in a forward direction about the axis of the shaft 13, or in a clockwise direction, as shown in Fig. 1, the pinion 19 will be drawn over the periphery of the gear 14, and as the latter will be restrained from movement in this direction the pinion will be caused to rotate, which will, in turn, rotate the feed drum 20, as both pinion and drum are secured to the shaft 18.

Figure 2:
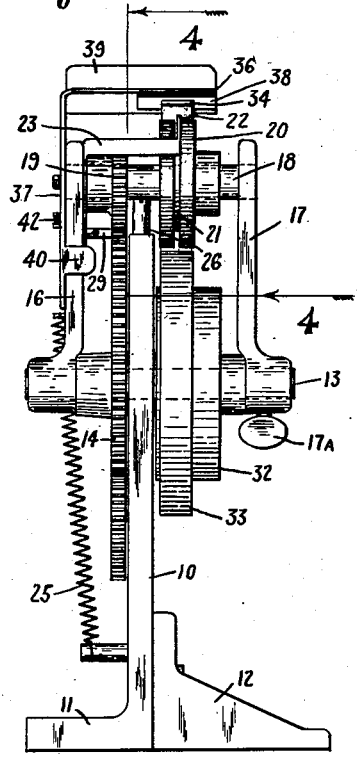
Fig. 2 is a front elevational view thereof.

A spring 25 is secured at one end to the plate 10 and at the other end to the arm 16, so as to normally maintain the carrier for the feed drum in a rearward position, or in the position shown in Fig. 1, in which the shaft 18 lies against a stop member 26 (Fig. 2) positioned upon the upper edge of the plate 10.

Figure 4:
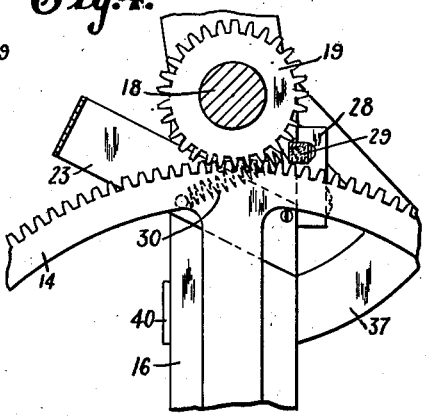
Fig. 4 is a partial sectional view on line 4—4 of Fig. 2.

Also secured to the arm 16 by the block 28 is a pawl or wedge member 29 which extends laterally to a point adjacent the teeth of the pinion 19 and gear 14. This member 29 is preferably made of leather, fiber or some similar material, and is urged into engagement with the teeth of the pinion by a spring 30 secured to the arm 16 at one end and to the member 29 at the other end. As shown in Fig. 4, this wedge member will tend to be drawn into the meshing of the teeth of the pinion 19 and gear 14 if the pinion is moved in a clockwise direction in Fig. 4, or a counterclockwise direction in Fig. 1. Therefore, when the feed drum carrier frame is moved in a clockwise direction, as shown in Fig. 1, the pinion 19 will be permitted to rotate over the teeth of the gear 14, the latter being restrained from rotation by the pawl 15. However, when the carrier is moved in a counterclockwise direction by the spring 25, the wedge member 29 will prevent rotation of the pinion 19 so as to prevent rotation of the feed drum in an anti-feeding direction, and during this movement of the carrier, the pinion being restrained from rotation, the gear 14 will be rotated in a counterclockwise direction, as shown in Fig. 1, such rotation being permitted by the pawl 15.

Also rotatably mounted on the shaft 13 is a holder 32 for the supply roll of tape 33, the free end of this tape, as shown at 34, being trained over the feed drum 20 so as to adhere to the surface of the latter. It may be noted that the arm 17 is removably secured to the shaft 13 by the set screw 17ª so that it may be removed to replace the supply roll of tape. It will be apparent that, when the operator grasps the free end of the tape and draws it forwardly, or to the right, as shown in Fig. 1, the carrier of the feed drum will be drawn forwardly or in a clockwise direction, thus effecting rotation of the feed drum to draw a length of the tape from the supply roll.

A severing member in the form of a tear-off blade 36 is provided upon the horizontal portion of an L-shaped arm 37, this arm being pivoted upon the arm 16 coincidently with the axis of the shaft 18. A resilient spring stripper member 38 is provided below the severing member 36 to prevent any tendency of the tape to adhere to the latter. Also formed with the arm 37 and upstanding above the severing member 36 is a flange 39, which may be engaged by the hand of the operator, when he is about to grasp the free end of the tape, to move the severing member rearwardly, so that the free end of the tape will be exposed and accessible.

Figure 3:
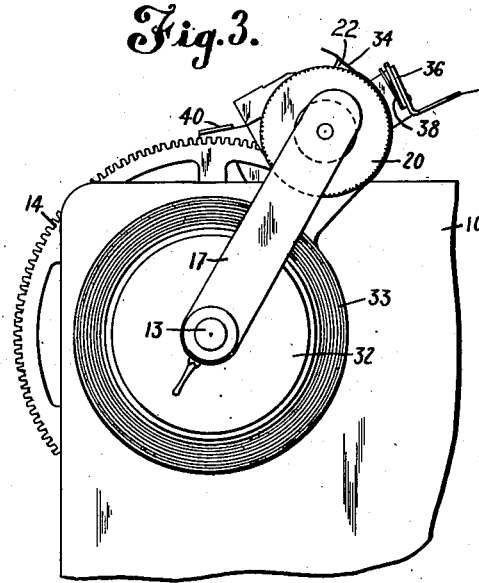
Fig. 3 is a side elevational view of the upper portion of the machine showing the side opposite that shown in Fig. 1.

Below the shaft 18 the arm 37 is of greater width than above the shaft, and is provided with laterally extending stop flanges 40 and 41 adapted to engage the arm 16 and limit the pivotal movement of the arm 37 and the severing member thereon. A spring 42, secured to the arm 16 and to the arm 37, normally maintains the latter in the position shown in Fig. 1, in which the severing member 36 stands in a forward position, or in the position it occupies when the tape is torn off against it. The rearward position of the severing member is shown in Fig. 3, where it will be noted the free end 34 of the tape is exposed, so that it may be readily grasped.

The operation of my device is as follows: With the parts in the position shown in Fig. 1, the operator extends his hand to grasp the tape. He may engage the flange 39 with the middle or third finger of his hand, so as to move the severing member from the position shown in Fig. 1 to that shown in Fig. 3, in which the free end of the tape is exposed so that it may be readily grasped between the thumb and forefinger. He then exerts a forward pull upon the end of the tape, thus drawing the feed drum forwardly, together with the arms 16 and 17, and, by means of engagement of the pinion 19 with the now latched gear 14, effects rotation of the feed drum in a direction to draw a length of tape from the supply roll 33.

It will be apparent that the length of tape dispensed will be equal to the length of the arc through which the periphery of the feed drum 20 is rotated. It will also be apparent that the hand of the operator, when drawing tape from the machine by a pull on the free end of the tape, will not only be moved through this distance, but in addition will be moved through a distance equal to the forward movement of the upper ends of the arms 16 and 17. Thus the effort of the operator will be exerted over a distance greater than the length of tape dispensed.

It will be seen that due to the mechanical advantage obtained less effort is required to strip the tape from the supply roll than would be required if it were done by a straight pull upon the end of the tape.

When the required length of tape has been drawn from the supply roll, the operator moves the tape upwardly against the severing member 36 and severs the dispensed portion from the remainder. The movement of the tape upwardly will, of course, move this portion of the tape out of engagement with the periphery of the feed drum 20. It might sometimes occur, however, particularly if the tape has a static charge, that this free end would again drop downwardly and cling to the surface of the drum. For this reason, there is provided the stripper finger 22, the end of which, as shown in Figs. 1 and 3, occupies a position below the severing member, so that this free end of the tape cannot cling to the surface of the drum, but will be spaced therefrom so that it may be grasped by the operator.

As soon as the tape is thus severed, the spring 25 draws the carrier comprising the arms 16 and 17 rearwardly or in a counterclockwise direction, as shown in Fig. 1, until the shaft 18 strikes the stop 26. During this movement the pinion 19 is prevented from rotation by the pawl or wedge member 29, and the gear or rack member 14 is caused to rotate with the carrier and pinion 19, this movement being permitted by the pawl 15, which permits the gear 14 to rotate in this direction. The parts are then again in the position shown in Fig. 1, in readiness for a further operation.

In Figs. 5 to 8 of the drawing I have shown a modified form of my invention, which is generally similar to that form shown in Figs. 1 to 4 and described above. In this form of the invention there is also employed the frame plate or standard 10, the gear 14, and the carrier arms 16 and 17 in the upper ends of which is rotatably mounted the shaft 18. To this shaft is secured the pinion 19 and the feed drum 20, these parts all operating, as previously described, to draw the tape from the supply roll 33 mounted upon the roll holder 32, which in turn is rotatably carried by the shaft 13. The principal points of difference in the present modification relate to the means for stripping the tape from the feed drum and the manner in which the movement of the gear or rack 14 is controlled.

Figure 5:
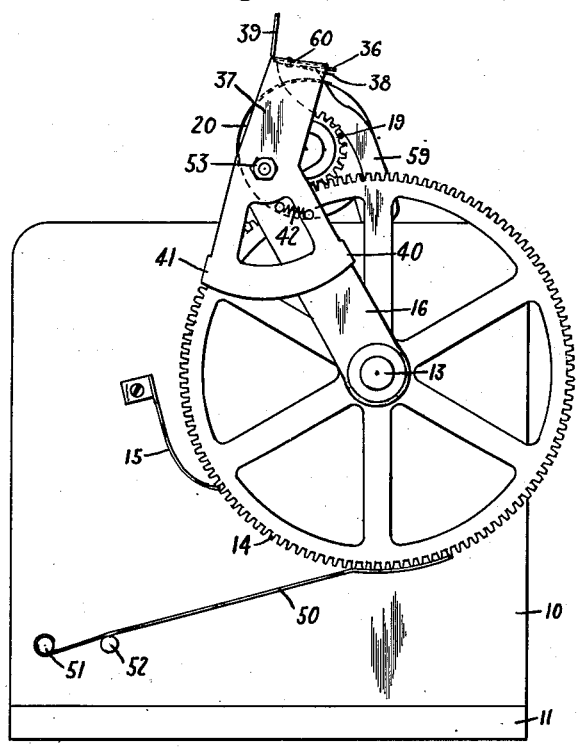
Fig. 5 is a view similar to Fig. 1, showing a modified form of my device.
Figure 6:
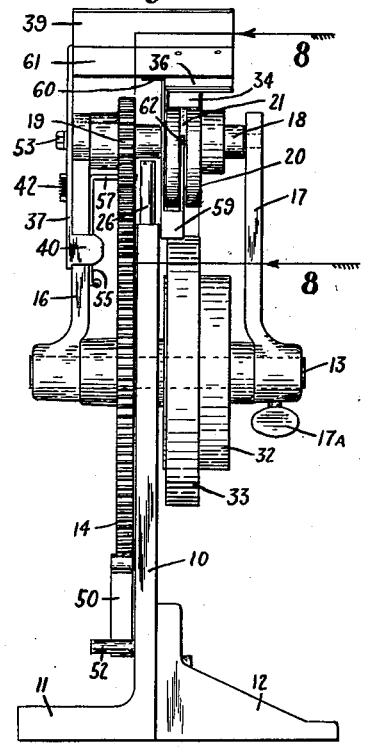
Fig. 6 is a front elevational view of the form of my device shown in Fig. 5.
Figure 7:
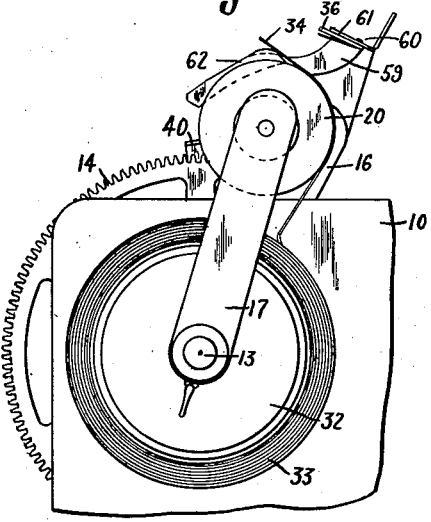
Fig. 7 is a side elevational view of the upper portion of the device showing the side opposite that shown in Fig. 5.

It will be noted that in this form of my invention the spring 25 has been omitted, and while the gear 14 is prevented from moving in a clockwise direction, as shown in Fig. 5, by the pawl 15, its movement in a counterclockwise direction is frictionally restrained by the engagement with the periphery of the gear of a spring 50 secured to the frame plate 10 at 51, which spring bears against a pin 52 secured to the plate, so that, by its inherent resilience, it will be urged into contact with the periphery of the gear. Thus the gear 14 will tend to remain in any position to which it is moved, but can be moved in a counterclockwise direction by the application of a positive effort to that end against the tension of the spring 50.

As before, a tear-off blade 36 and stripper 38 are carried by an arm 37 pivoted at 53 to the carrier arm 16, and a flange 39 is also carried by the arm 37 to be engaged by the operator to move the severing member rearwardly or to the left, as shown in Fig. 5, and also in this case to move the carrier and pinion 19 in a rearward direction. Thus the operator, by engaging this flange, positively moves the carrier and pinion, together with the gear 14, rearwardly or in a counterclockwise direction, as shown in Fig. 5, which work was performed in the modification first described by the spring 25.

The lower portion of the arm 37 is provided with the laterally extending lugs 40 and 41, as before, and also there is provided the spring 42 normally holding the arm 37 in its forward position, as shown in Fig. 5.

Figure 8:
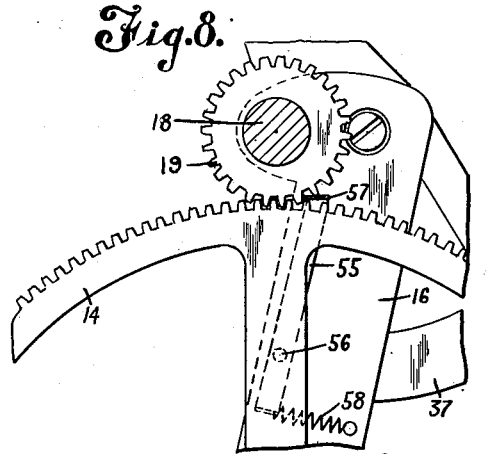
Fig. 8 is a sectional view on line 8—8 of Fig. 6.

A pawl 55 is pivoted at 56 to the inner face of the arm 16, this pawl having a laterally turned end 57 to engage the teeth of the pinion 19 and prevent rotation of this pinion in an anti-feeding direction, or in a clockwise direction, as shown in Fig. 8. A spring 58, secured at one end to the pawl below the pivot 56 and secured at its other end to the arm 16, urges the pawl toward the teeth of the pinion. Thus, when the carrier is moved in a rearward or counterclockwise direction, as shown in Fig. 5, the pinion will be restrained from rotation, and this movement will effect rotation of the gear 14 against the frictional action of the spring 50.

It will be noted that the pivot 53 of the arm 37 is eccentric to the axis of the shaft 18 in this form of my invention, as distinguished from the construction shown in the modification illustrated in Figs. 1 to 4, whereby the arm 37 will rock about an axis eccentric to that of the feed drum 20. A stripper in the form of a stirrup member 59 is secured at 60 to the laterally extending portion 61 of the arm 37, this stripper being provided with a stripping finger 62 disposed in the annular groove 21 of the feed drum 20. As shown in Fig. 5, this stripper finger normally lies below the peripheral surface of the feed drum, so that it will not interfere with the engagement of the tacky side of the tape therewith. However, when the arm 37 is moved from its forward position, shown in Fig. 5, to its rearward position, shown in Fig. 7, the stripper finger 62, which is fixed with respect to the arm 37, will be rocked about the pivot 53, and, as this pivot is eccentric to the axis of the feed drum, the finger 62 will be moved to the position shown in Fig. 7, in which it lies above the surface of the feed drum and will act to positively strip the free end 34 of the tape therefrom.

The operation of this device is as follows: At the end of a cycle of operations the carrier comprising the arms 16 and 17 will stand in a forward position, the parts being retained in this position by the spring 50. When the operator desires to draw a length of tape from the supply roll, he engages the flange 39 with his fingers and moves the arm 37 rearwardly, or in a counterclockwise direction, as shown in Fig. 5. This action first swings the arm 37 about its pivot and raises the stripper finger 62 to the position shown in Fig. 7, so as to insure that the free end of the tape projects from the feed drum, in order that it may be readily grasped. Continued pressure against the flange 39 after the stop lug 41 strikes the side of the arm 16 moves the carrier in a counterclockwise direction together with the pinion 19 and feed drum. As the pinion 19 is prevented from rotating by the pawl 55, the gear 14 rotates in a reverse or counterclockwise direction, as shown in Fig. 5, during this movement against the friction of the spring 50. This movement continues until the shaft 18 strikes the stop member 26 on the plate 10. The operator then grasps the end of the tape, which is exposed by rearward movement of the severing member, and by a forward pull upon the tape, draws the carrier forwardly, thus effecting rotation of the pinion 19 and feed drum 20 to draw the required length of tape from the supply roll. When a sufficient length has been so drawn, the end of the tape is raised and torn off against the knife 36. The resilient stripper blade 38 then serves to strip the tape from the severing knife if there is any tendency of the tape to cling thereto. The parts remain in this forward position until moved rearwardly, as described above.

In both forms of the invention, the carrier of the feed drum may be moved in a forward or tape-feeding direction by engagement of the rear face of the flange 39 by the operator, and a forward pull upon this flange. This will effect the dispensing of a length of tape in the same manner as if a pull is exerted upon the tape.

Also, it will be noted that the tape holder 32 is loosely mounted upon the shaft 13, so that the supply roll of tape oscillates to some extent with the carrier. That is, when the carrier is moved from the position shown in Fig. 3 to a forward position, the supply roll of tape will also be rotated forwardly to a slight extent, and a reverse rotation of the roll will occur upon the reverse movement of the carrier. In this way, the length of tape between the supply roll and the feed drum will always remain approximately the same, which would not be the case if the roll holder were not free to oscillate with the carrier.

While I have shown and described some preferred embodiments of my invention, it will be understood that it is not to be limited to all of the details shown, but is capable of modification and variation within the spirit of the invention and within the scope of the claims.

What I claim is:

1. A machine for dispensing pressure-sensitive tape comprising a frame, a feed drum to which the tacky side of the tape adheres, a carrier on which said drum is mounted for rotation relatively thereto, means for mounting said carrier on the frame for movement in a forward tape-feeding direction and in a reverse direction, and cooperating means on the frame and drum to effect rotation of the drum relatively to the carrier by movement of the carrier in a tape-feeding direction.

2. A machine for dispensing pressure-sensitive tape comprising a frame, a feed drum to which the tacky side of the tape adheres, a carrier on which said drum is mounted for rotation relatively thereto, means for mounting said carrier on the frame for movement in a forward tape-feeding direction and in a reverse direction, cooperating means on the frame and drum to effect rotation of the drum relatively to the carrier by movement of the carrier in a tape-feeding direction, and means on the carrier for restraining said drum from rotation when the carrier is moved in a reverse direction.

3. A machine for dispensing pressure-sensitive tape comprising a frame, a feed drum to which the tacky side of the tape adheres, a carrier on which said drum is mounted for rotation relatively thereto, means for mounting said carrier on the frame for movement in a forward tape-feeding direction and in a reverse direction, and cooperating means on the frame and drum to effect rotation of the drum relatively to the carrier by movement of the carrier in a tape-feeding direction, said means comprising a pinion secured to the drum and a gear mounted on the frame meshing with said pinion.

4. A machine for dispensing pressure-sensitive tape comprising a frame, a feed drum to which the tacky side of the tape adheres, a carrier on which said drum is mounted for rotation relatively thereto, means for mounting said carrier on the frame for movement in a forward tape-feeding direction and in a reverse direction, cooperating means on the frame and drum to effect rotation of the drum relatively to the carrier by movement of the carrier in a tape-feeding direction, said means comprising a pinion fixed with respect to the drum and a gear rotatably mounted on the frame and meshing with said pinion, and means on the frame engaging said gear to hold it against rotation when the carrier is moved in a direction to rotate the drum.

5. A machine for dispensing pressure-sensitive tape comprising a frame, a feed drum to which the tacky side of the tape adheres, a carrier on which said drum is mounted for rotation relatively thereto, means for mounting said carrier on the frame for movement in a forward tape-feeding direction and in a reverse direction, cooperating means on the frame and drum to effect rotation of the drum relatively to the carrier by movement of the carrier in a tape-feeding direction, said means comprising a pinion fixed with respect to the drum and a gear rotatably mounted on the frame and meshing with said pinion, and means on the frame engaging said gear to hold it against rotation when the carrier is moved in a direction to rotate the drum, said means permitting rotation of said gear when the carrier is moved in a reverse direction.

6. A machine for dispensing pressure-sensitive tape comprising a frame, a feed drum to which the tacky side of the tape adheres, a carrier on which said drum is mounted for rotation relatively thereto, means for mounting said carrier on the frame for movement in a forward tape-feeding direction and in a reverse direction, cooperating means on the frame and drum to effect rotation of the drum relatively to the carrier by movement of the carrier in a tape-feeding direction, said means comprising a pinion fixed with respect to the drum and a gear rotatably mounted on the frame and meshing with said pinion, means on the frame engaging said gear to hold it against rotation when the carrier is moved in a direction to rotate the drum, and means on the carrier to hold said pinion against rotation when the carrier is moved in the opposite direction.

7. A machine for dispensing pressure-sensitive tape comprising a frame, a carrier arm pivoted on the frame for oscillating movement, a cylindrical feed member rotatably mounted on said arm and adapted to be engaged by the tacky side of the tape, means for supporting a supply roll of tape adjacent said member, and cooperating means on the frame and feed member for effecting rotation of said feed member by movement of said arm in a direction to draw the tape from the supply roll.

8. A machine for dispensing pressure-sensitive tape comprising a frame, a carrier arm pivoted on the frame for oscillating movement, a cylindrical feed member rotatably mounted on said arm and adapted to be engaged by the tacky side of the tape, means for supporting a supply roll of tape adjacent said member, cooperating means on the frame and feed member for effecting rotation of said feed member by movement of said arm in a direction to draw the tape from the supply roll, and means restraining said member against rotation when said arm is moved in the reverse direction.

9. A tape-dispensing machine comprising a feeding drum, a carrier on which said drum is rotatably mounted to rotate with respect to the carrier, means for mounting said carrier for movement in forward and reverse directions, means for effecting rotation of said drum upon movement of the carrier in a forward direction, and a severing member mounted on said carrier member.

10. A tape-dispensing machine comprising a feeding drum, a carrier on which said drum is rotatably mounted to rotate with respect to the carrier, means for mounting said carrier for movement in forward and reverse directions, means for effecting rotation of said drum upon movement of the carrier in a forward direction, a severing member mounted on said carrier, and tape-stripping means mounted on said carrier to cooperate with the feeding drum.

11. A tape-dispensing machine comprising a feeding drum, a carrier on which said drum is rotatably mounted to rotate with respect to the carrier, means for mounting said carrier for movement in forward and reverse directions, means for effecting rotation of said drum upon movement of the carrier in a forward direction, tape-severing means and tape-stripping means movably mounted on said carrier, and said tape-stripping means being moved to strip a free end of the tape from the feeding drum by movement of said severing means to expose said end.

12. A tape-dispensing machine comprising a frame, a carrier mounted for back and forth movements on the frame, tape-feeding means rotatably mounted on said carrier to rotate with respect thereto and having a tape-engaging peripheral surface, a severing member, and means mounting said severing member on said carrier for movement relatively to the carrier.

13. A tape-dispensing machine comprising a frame, a carrier mounted for back and forth movements on the frame, tape-feeding means rotatably mounted on said carrier to rotate with respect thereto and having a tape-engaging peripheral surface, a severing member, a stripper connected to said member, and means pivotally mounting said severing member on the carrier on an axis eccentric to the axis of the feeding means.

14. A tape-dispensing machine comprising a frame, a carrier mounted for back and forth movements on the frame, tape-feeding means rotatably mounted on said carrier to rotate with respect thereto and having a tape-engaging peripheral surface, a severing member disposed adjacent the feeding means, and means mounting said severing member on the carrier for movement relatively to the tape on said feeding means.

15. A tape-dispensing machine comprising a frame, a carrier mounted for back and forth movements on the frame, tape-feeding means rotatably mounted on said carrier to rotate with respect thereto and having a tape-engaging peripheral surface, a severing member, means mounting said severing member on the carrier for movement relatively to the tape on said feeding means, means for effecting back and forth movement of the severing member, and stripping means, actuated by movement of the severing member, to strip the tape from the feeding means.

16. A tape-dispensing machine comprising a frame, a carrier mounted for back and forth movements on the frame, tape-feeding means rotatably mounted on said carrier to rotate with respect thereto and having a tape-engaging peripheral surface, a severing member pivotally mounted on the carrier, said severing member being disposed adjacent the tape-engaging surface of the feeding means, and means for limiting the movement of the severing means relatively to the carrier.

17. A tape-dispensing machine comprising a frame, a carrier mounted for back and forth movements on the frame, tape-feeding means rotatably mounted with respect to said carrier and having a tape-engaging peripheral surface, a severing member pivotally mounted on the carrier, said severing member being disposed adjacent the tape-engaging surface of the feeding means, said severing member normally standing in a forward position when the carrier is in a rearward position, and stripper means connected to the severing means to be operated by the movement thereof.

18. A tape-dispensing machine comprising a frame, a carrier mounted for back and forth movements on the frame, tape-feeding means rotatably mounted on said carrier to rotate with respect thereto and having a tape-engaging peripheral surface, a severing member pivotally mounted on the carrier, said severing member being disposed adjacent the tape-engaging surface of the feeding means, and said severing member normally standing in a forward position when the carrier is in a rearward position and being movable to a rearward position to expose the free end of the tape on the feeding means.

ALFRED P. KRUEGER.

REFERENCES CITED

The following references are of record in the file of this patent:

UNITED STATES PATENTS

| Number | Name | Date |
|---|---|---|
| 256,633 | Bray | Apr. 18, 1882 |
| 552,947 | Williams | Jan. 14, 1896 |
| 1,299,087 | Winterhalter | Apr. 1, 1919 |
| 1,996,204 | Ingram | Apr. 2, 1935 |
| 2,196,921 | Hurxthal | Apr. 9, 1940 |
| 2,454,844 | Sharpe | Nov. 30, 1948 |

FOREIGN PATENTS

| Number | Country | Date |
|---|---|---|
| 18,096 | Great Britain | Aug. 6, 1912 |